(12) United States Patent
Krouth et al.

(10) Patent No.: US 7,495,451 B2
(45) Date of Patent: Feb. 24, 2009

(54) TERMINAL LEAKAGE MONITORING FOR FIELD DEVICES

(75) Inventors: Terrance F. Krouth, Eden Prairie, MN (US); Rongtai Wang, Eden Prairie, MN (US); Kris Allen Wendorf, Bloomington, MN (US)

(73) Assignee: Rosemount Inc., Eden Prairie, MN (US)

( * ) Notice: Subject to any disclaimer, the term of this patent is extended or adjusted under 35 U.S.C. 154(b) by 193 days.

(21) Appl. No.: 11/648,199

(22) Filed: Dec. 28, 2006

(65) Prior Publication Data

US 2008/0158754 A1    Jul. 3, 2008

(51) Int. Cl.
  *G01R 31/08* (2006.01)
  *G01R 25/00* (2006.01)
  *G01M 3/04* (2006.01)
(52) U.S. Cl. .............. 324/522; 702/65; 73/40
(58) Field of Classification Search ......... 324/522, 324/512, 500, 718, 555, 713; 702/6, 7, 65; 73/40
  See application file for complete search history.

(56) References Cited

U.S. PATENT DOCUMENTS

| | | | |
|---|---|---|---|
| 4,382,382 A * | 5/1983 | Wang | 73/304 R |
| 4,796,186 A * | 1/1989 | Kaufman | 702/7 |
| 5,083,091 A | 1/1992 | Frick et al. | |
| 5,481,200 A | 1/1996 | Voegele et al. | |
| 6,058,775 A * | 5/2000 | Levy | 73/290 V |
| 6,611,775 B1 * | 8/2003 | Coursolle et al. | 702/65 |
| 2005/0289276 A1 * | 12/2005 | Karschnia et al. | 710/305 |
| 2006/0170579 A1 * | 8/2006 | Ohnhaeuser et al. | 341/143 |

* cited by examiner

*Primary Examiner*—Vincent Q Nguyen
*Assistant Examiner*—Hoai-An D Nguyen
(74) *Attorney, Agent, or Firm*—Kinney & Lange, P.A.

(57) ABSTRACT

A field device detects the presence of terminal leakage between a first terminal and a second terminal in the terminal block area of the field device using a voltage variation ratio that is based on variations in a terminal voltage located across output terminals of a field device and variations in a current regulation voltage located within a current regulation circuit. Preferable, the field device measures an initial voltage variation ratio $\kappa_0$ and a subsequent voltage variation ratio $\kappa_t$. Based on the initial voltage variation ratio $\kappa_0$ and the subsequent voltage variation ratio $\kappa_t$, the terminal leakage existing between the first terminal and the second terminal can be calculated.

25 Claims, 9 Drawing Sheets

US 7,495,451 B2

TERMINAL LEAKAGE MONITORING FOR FIELD DEVICES

BACKGROUND OF THE INVENTION

The present invention relates to monitoring the condition of field devices. Specifically, the invention relates to a system for detecting the presence of fluids in the field devices.

In many industrial settings, control systems are used to monitor and control inventories, processes, and the like. A typical control system includes a centralized control room and a number of field devices geographically removed from the control room. The field devices communicate process data to the control room using either analog or digital communication means.

Traditionally, analog field devices have been connected to the control room by two-wire twisted-pair current loops, with each field device connected to the control room by a single two-wire twisted pair loop. Located within the field device housing are terminals for connecting the twisted-pair current loops to circuitry within the field device. This region is referred to as the terminal block area of the field device. Typically, a voltage differential is maintained between the two wires of approximately 20 to 25 volts, and a current between 4 and 20 milliamps (mA) runs through the loop. An analog field device transmits a signal to the control room by modulating the current running through the current loop to a current proportional to the sensed process variable. A receiving device measures the voltage across a load resistor, typically located in the control room, in order to determine the magnitude of the modulated current.

While historically field devices were capable of performing only one function, recently, hybrid systems that superimpose digital data on the current loop have been used in distributed control systems. The Highway Addressable Remote Transducer (HART) and the Instrument Society of America (ISA) Fieldbus SP50 standards superimpose a digital carrier signal on the current loop signal. The HART standard employs frequency-shift keying (FSK) to transmit digital data over the current loop, and operates at frequencies of 1200 and 2400 baud. Other common protocols for communication of digital information over the current loop are Foundation Fieldbus, Profibus, and DeviceNet. Typically, these systems operate at much higher frequencies than the HART protocol. The digital carrier signal can be used to send secondary and diagnostic information. Examples of information provided over the carrier signal include secondary process variables, diagnostic information (such as sensor diagnostics, device diagnostics, wiring diagnostics, process diagnostics, and the like), operating temperatures, sensor temperature, calibration data, device ID numbers, configuration information, and so on. Accordingly, a single field device may have a variety of input and output variables and may implement a variety of functions.

Field devices are often located in physically challenging environments, with one potential problem being the collection of fluid within the terminal block area of the field device. The presence of fluid within the terminal block area can result in a conductive path between the terminals of the field device, known as terminal leakage. The presence of terminal leakage in a field device affects the ability of the field device to accurately communicate the measured process variables to the control room. The ability to accurately communicate the values associated with a measured process variable to the control room is important to ensuring proper operation of control processes. It is difficult and time-consuming, however, to periodically inspect each field device for the presence of fluid in the terminal block. Therefore, it would be beneficial to design a system for automatically detecting the presence of fluids with the terminal block area of field devices.

BRIEF SUMMARY OF THE INVENTION

In one aspect of the present invention, terminal leakage is detected by measuring a voltage ratio value based on a comparison of a terminal voltage variation value and a current regulator voltage variation value. Terminal leakage is determined by comparing the voltage ratio value with a previously measured voltage ratio value.

While the above-identified drawings set forth an embodiment of the invention, other embodiments are also contemplated, as noted in the discussion. In all cases, this disclosure presents the invention by way of representation and not limitation. It should be understood that numerous other modifications and embodiments may be devised by those skilled in the art, which fall within the scope and spirit of the principles of the invention. The figures may not be drawn to scale. Like reference numbers have been used throughout the figures to denote like parts.

DETAILED DESCRIPTION

Figure 1:
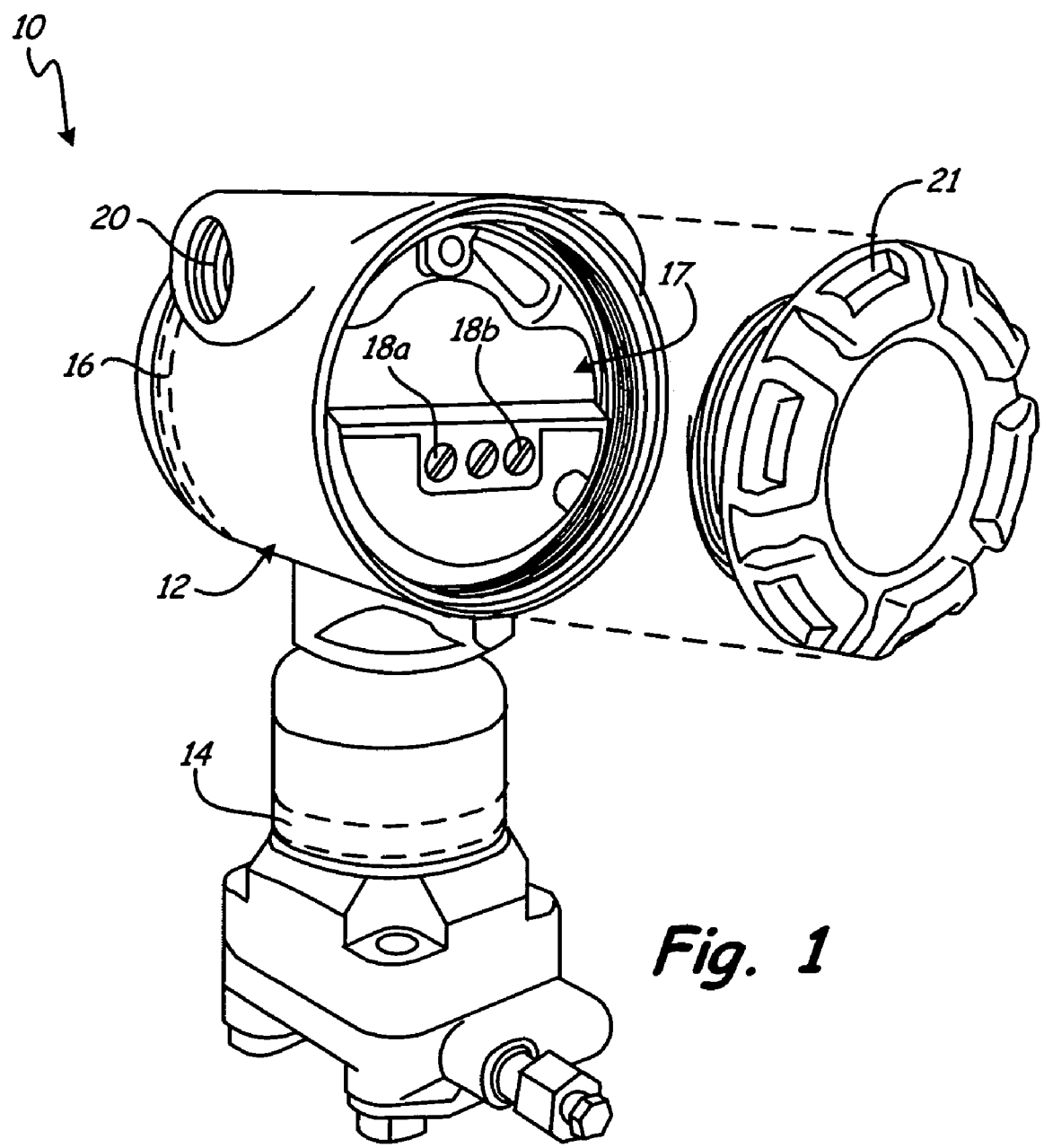
FIG. 1 is a perspective view of a field device.

FIG. 1 illustrates field device 10, which includes housing 12, sensor board 14, circuit board 16, and terminal block 17 (which includes at least two terminals labeled 18a and 18b). Sensor board 14 measures a process variable (e.g. pressure, temperature, flow, etc.) and converts the measured process variable to an electronic signal. Circuit board 16 converts the signal provided by sensor board 14 to a signal that can be communicated to a control room, using either the traditional 4-20 mA analog communication technique, or some form of digital communication protocol (e.g., HART). Wiring from the control room enters field device 10 through field conduit port 20, and is connected to terminals 18a and 18b within terminal block 17.

Terminal block 17 includes threads that allow a cover 21 to be placed over terminal block 17. Ideally, housing 12 and cover 21 act to protect terminals 18a and 18b from environmental factors, such as fluid accumulation in terminal block 17. Despite these efforts, fluids do on occasion accumulate within terminal block 17. Because the presence of fluid between terminals 18a and 18b can adversely affect communication between field device 10 and a control room (shown in FIGS. 4A and 4B), the ability to detect terminal leakage within terminal block 17 would be very beneficial.

Figure 2:
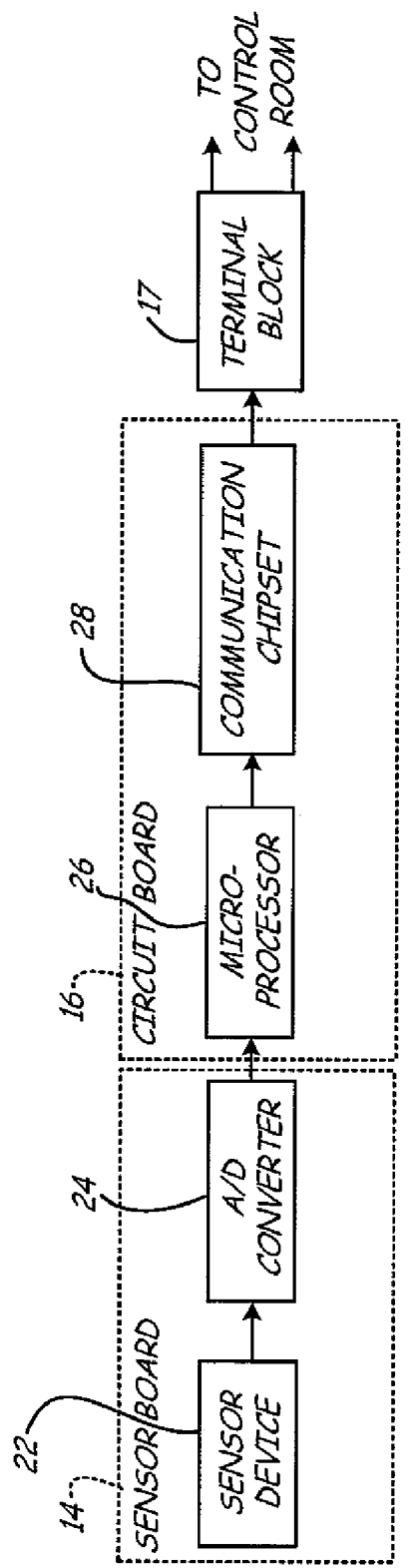
FIG. 2 is a functional block diagram of the components located within the field device.

FIG. 2 is a functional block diagram that illustrates how a monitored process variable is processed within field device 10 before being communicated to the control room. As shown in FIG. 2, sensor board 14 includes sensor device 22 and analog-to-digital converter 24, and circuit board 16 includes microprocessor 26 and communication chipset 28. Sensor device 22 measures a process variable, such as pressure or temperature, and converts the measured process variable to an analog signal. Sensor device 22 provides the analog signal representing the sensed process variable to A/D converter 24, which converts the analog signal to a digital signal that is provided to microprocessor 26. Microprocessor 26 (also referred to as a microcontroller) refers broadly to a device capable of performing calculations and communicating with other components. Microprocessor 26 may include a memory device for storing input provided by connected devices. At the request of microprocessor 26, communication chipset 28 converts a signal received from microprocessor 26 to a signal that can be communicated to the control room.

Communication chipset 28 communicates with the control room, in one embodiment, by regulating current provided to terminals 18a and 18b between 4-20 mA, wherein the magnitude of the current provided by communication chipset 28 represents the magnitude of the sensed process variable. In addition, communication chipset 28 may communicate with the control room by superimposing a digital signal over the standard 4-20 mA signal (i.e., using a protocol known as the HART protocol). The digital signal is communicated by modulating the 4-20 mA signal by ±0.5 mA. In another embodiment, instead of analog communication using a 4-20 mA current regulation, field device 10 communicates digitally with the control room using a protocol known as Foundation Fieldbus. Much of this disclosure describes an embodiment in which field device 10 communicates with the control room via a standard 4-20 mA analog signal, although the present invention is applicable to embodiments that employ digital communication as well.

Figure 3:
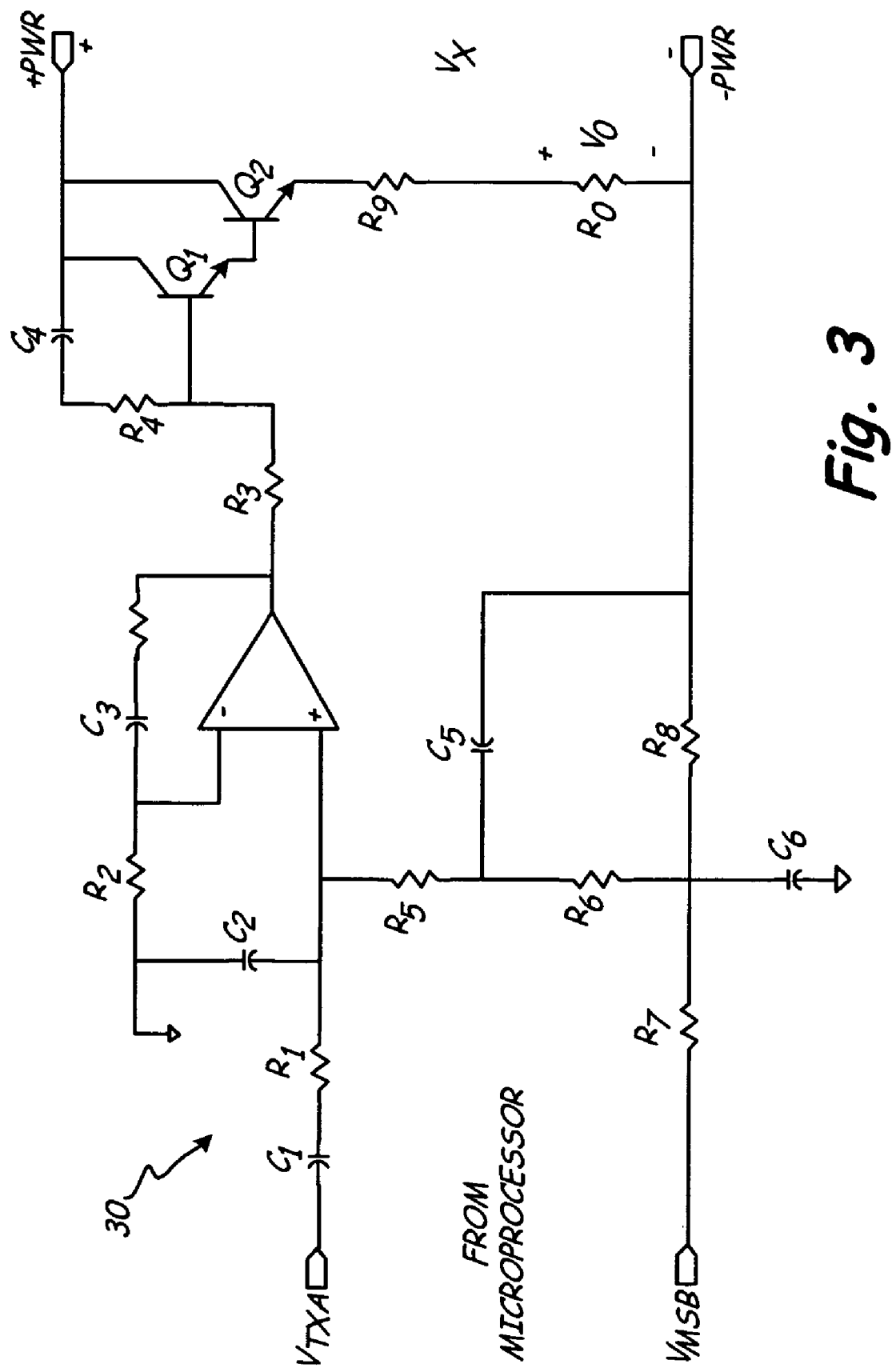
FIG. 3 is a circuit diagram of a current regulator circuit employed by the field device.

FIG. 3 is a circuit diagram illustrating an embodiment of current regulator circuit 30, located within communication chipset 28 (shown in FIG. 2), that converts the digital signal provided by microprocessor 26 (also shown in FIG. 2) to an analog 4-20 mA signal that is provided to the control room. Current regulator circuit 30 includes input terminal $V_{TXA}$ and input terminal $V_{MSB}$, capacitors C1, C2, C3, C4 and C5, resistors R0 (also referred to as current regulator resistor R0), R1, R2, R3, R4, R5, R6, R7, R8, and R9, operational amplifier OpAmp1, transistors Q1 and Q2, and output terminals +PWR and −PWR that connect to terminals 18a and 18b. Input is provided by microprocessor 26 at input terminals $V_{TXA}$ and $V_{MSB}$, and output is provided to the control room via output terminals +PWR and −PWR.

Current regulator circuit 30 regulates the current generated through resistor R0 based on the inputs received at input terminals $V_{TXA}$ and $V_{MSB}$. The signal provided by microprocessor 26 to input terminal $V_{MSB}$ represents the sensed process variable, and the magnitude of the signal provided to input terminal $V_{MSB}$ dictates the magnitude of the 4-20 mA current provided through resistor R0. That is, current regulation circuit 30 varies the current provided through resistor R0 between 4 mA and 20 mA based on the signal provided at input terminal $V_{MSB}$.

In addition to the 4-20 mA analog current regulation provided by current regulator circuit 30 based on an input representative of the sensed process variable, current regulator circuit 30 may also regulate the current through resistor R0 to communicate a digital signal to the control room. The digital signal is communicated by modulating the analog 4-20 mA signal by ±0.5 mA (i.e., implementing the HART digital communication protocol). In this example, the digital signal is provided to current regulation circuit by microprocessor 26 at terminal $V_{TXA}$.

Figure 4A:
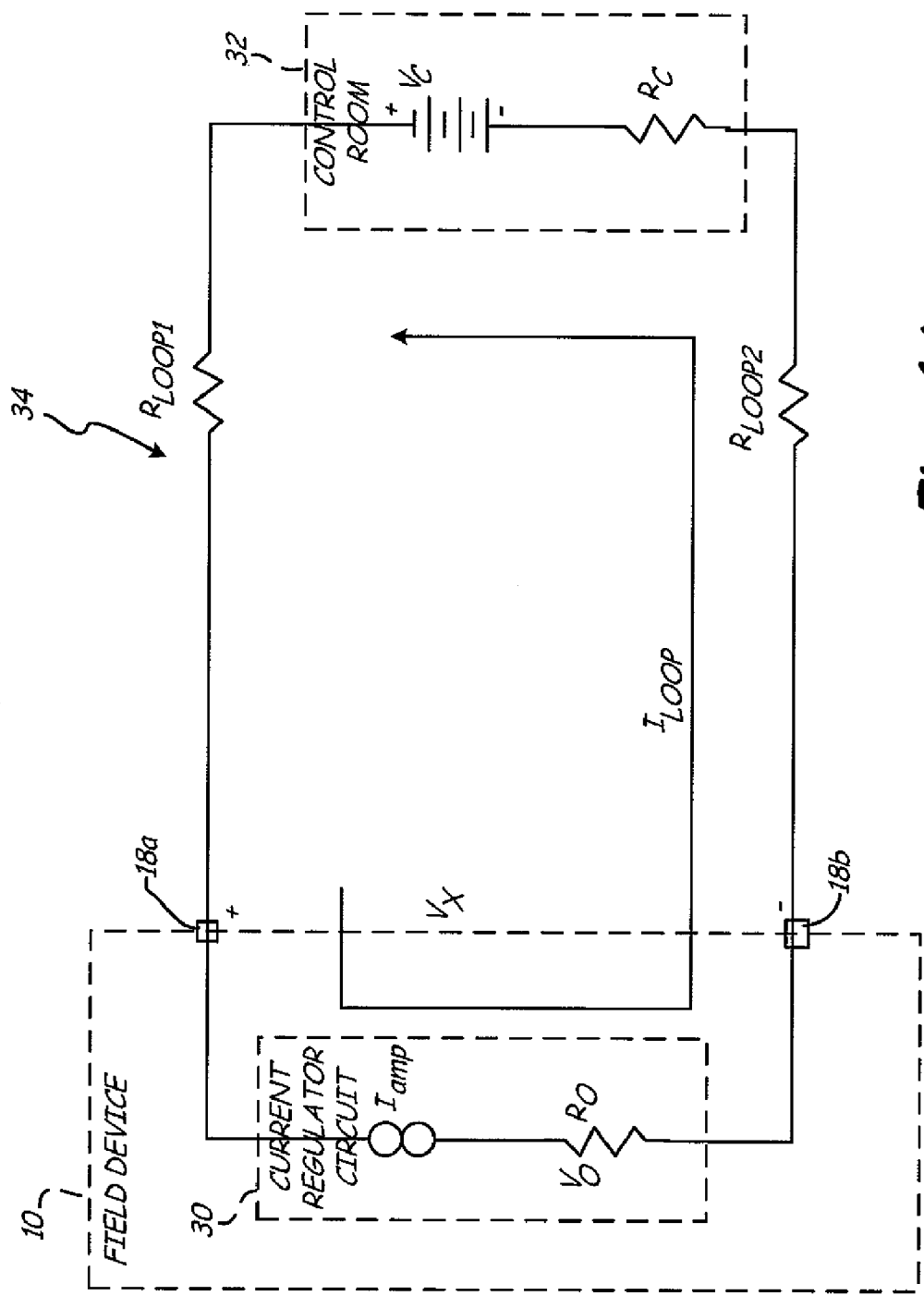
FIGS. 4A and 4B are circuit diagrams illustrating a field device connected to a control room by a current loop with and without the presence of terminal leakage.
Figure 4B:
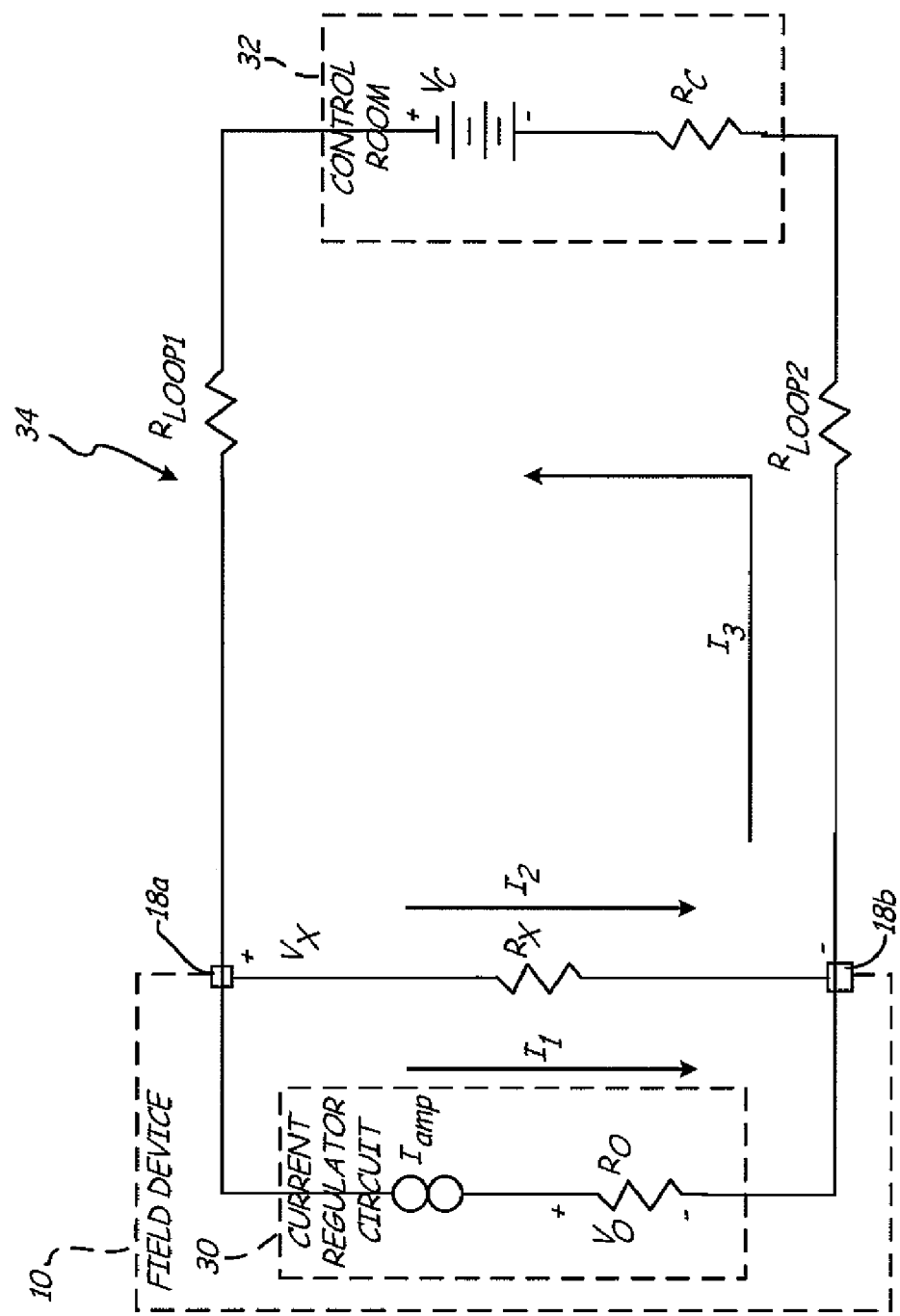

For both the analog 4-20 mA signal and the digital ±0.5 mA signal, knowledge of the total resistance between output terminals +PWR and −PWR allows current regulator circuit 30 to generate the correct current magnitude through resistor R0. In particular, current regulator circuit 30 determines the proper voltage to place across resistor R0 such that the proper 4-20 mA current is generated between output terminals +PWR and −PWR. As shown in FIGS. 4A and 4B below, the presence of terminal leakage varies the overall resistance of the system, and therefore skews the magnitude of the current generated by current regulation circuit 30. If the added resistance caused by terminal leakage is significant, then the magnitude of the current provided to the control room will not accurately reflect the magnitude of the sensed process variable.

FIGS. 4A and 4B illustrate the connection of field device 10 to control room 32. Field device 10 is connected by a twisted wire pair 34 (illustrated by resistors $R_{loop1}$ and $R_{loop2}$) to control room 32, which includes a power source $V_C$ and an internal resistor $R_C$. Control room 32 would also include a number of hardware components that allow control room 32 to interpret data provided by connected field devices. For instance, components located within control room 32 include computing systems, communication cards, and storage devices.

The current path created between field device 10 and control room 32 is referred to as the current loop $I_{loop}$. Field device 10 is represented by field terminals 18a and 18b, and current regulation circuitry 30 responsible for regulating loop current $I_{loop}$ to a magnitude proportional to the measured process variable. Current regulation circuitry 30 (shown in more detail in FIG. 3) is modeled here as an ideal current source $I_{loop}$ and current regulation resistor $R_O$ (same resistor shown in FIG. 3).

Terminal device 10 receives power from power source $V_C$, which provides approximately 20-25 volts to the twisted wire pair and terminal device 10. Current regulation circuit 30 regulates the current through resistor $R_0$ (as described with respect to FIG. 3) to communicate the value of the sensed process variable to control room 32. In addition, current regulation circuit 30 may regulate the current through resistor $R_0$ by ±0.5 mA to communicate digitally with control room 30.

As shown in FIG. 4A, because only a single current path exists between field device 10 and control room 32, the magnitude of the current set by current regulation circuit 30 through resistor $R_0$ is equal to the current measured through resistor $R_C$ by control room 32. In this way, the magnitude of the process variable is accurately communicated from terminal device 10 to control room 32.

Using Kirchoff's voltage law, a relationship between the terminal voltage $V_X$ (i.e., the voltage between terminals 18a and 18b) and the current regulation voltage $V_0$ (i.e., the voltage generated across resistor $R_0$ by current regulator circuit 30) can be related by the following formula.

$$\frac{\delta V_x}{\delta V_o} = -\frac{R_A}{R_o} \qquad \text{Equation 1}$$

The terminal voltage $V_X$ and current regulation voltage $V_0$ are expressed as voltage variations $\delta V_X$ and $\delta V_0$, respectively. The voltage variation value represents the difference between the voltage at a maximum value and at a minimum value (e.g., $\delta V_X = V_{X\_max} - V_{X\_min}$). Voltage variations in the terminal voltage $V_X$ and current regulation voltage $V_0$ are generated by modulating the loop current. In one embodiment, the digital communication capabilities of the field device are used to generate the desired current modulation (e.g., HART communication means of the field device could be used to modulate the loop current ±0.5 mA). Measuring the terminal voltage variation $\delta V_X$ and current regulation voltage variation $\delta V_0$ has the benefit of making the calculation of terminal leakage independent of variations in the supply voltage (which may vary over time) and loop currents (which vary based on the measured process variable). The value $R_A$ is defined as being equal to the loop resistance outside of field device 10 (i.e., $R_A = R_{loop1} + R_{loop2} + R_C$). This equation defines the relationship between the voltage across the terminals $V_X$ and the voltage generated across resistor $R_O$ by current regulation circuit 28.

FIG. 4B illustrates how the loop current is affected by the presence of terminal leakage, modeled by resistor $R_X$, between the terminals 18a and 18b of field device 10. The presence of terminal leakage results in the current loop between control room 32 and field device 10 being split into three components, a current regulation component $I_1$ a terminal leakage component $I_2$, and a control room/loop component $I_3$. The relationship between the three current components are defined by the following equation:

$$I_3 = I_1 + I_2 \qquad \text{Equation 2}$$

Current regulation circuit 28 regulates the current through resistor $R_0$ to be proportional to the process variable measured by field device 10. Therefore, current regulation component $I_1$ represents the process variable measured by field device 10. However, the presence of terminal leakage current component $I_2$ results in the magnitude of the control room/loop current component $I_3$ being greater than the current regulation component $I_1$. The difference in magnitude between the current regulation component $I_1$ and the control room/loop current $I_3$ results in control room 32 misinterpreting the value of the measured process variable.

Once again, using Kirchoff's voltage law, the relationship between the terminal voltage $V_X$ and the current regulation voltage $V_0$ is defined by the following equation:

$$\frac{\delta V_x}{\delta V_o} = -\frac{R_A // R_x}{R_o} \qquad \text{Equation 3}$$

Terminal voltage $V_X$ and current regulation voltage $V_0$ are expressed as voltage variations $\delta V_X$ and $\delta V_0$. A comparison between Equations 1 and 3 indicates that if the ratio between terminal voltage variation $\delta V_X$ and the current regulation voltage variation $\delta V_0$ can be measured, then the terminal leakage resistance $R_X$ can be determined. In one embodiment, the following method is used to determine the terminal leakage value $R_X$. For purposes of this explanation, the voltage variation ratio between $V_X$ and $V_0$ is represented as a dimensionless parameter $\kappa$. For the case without terminal leakage, this parameter can be expressed by the following equation:

$$\kappa_o = \frac{\delta V_o}{\delta V_x} = \frac{R_o}{R_A} = \frac{g_A}{g_o} \qquad \text{Equation 4}$$

In this equation, the term '$g_A$' refers to the conductance value associated with the current loop outside of field device 10 and the term '$g_o$' refers to the conductance of the resistor $R_O$ shown in FIGS. 4A and 4B.

For the case in which terminal leakage is present, the dimensionless parameter $\kappa_t$ is expressed as a conductance by the following equation:

$$\kappa_t = \frac{\delta V_o}{\delta V_x} = \frac{R_o}{R_A // R_x} = \frac{g_A + g_x}{g_o} \qquad \text{Equation 5}$$

In this equation, the term '$g_X$' represents the conductance of the terminal leakage resistor shown in FIG. 3B as resistor $R_X$.

Based on Equations 4 and 5, the leakage conductance can be expressed by the following equation:

$$g_X = (\kappa_t - \kappa_o) * g_o \qquad \text{Equation 6}$$

Therefore, Equation 6 states that if the ratio of terminal voltage variation $\delta V_X$ to current regulation voltage variation $\delta V_0$ can be measured in an initial state, when no leakage resistance is present, subsequent measurements of this ratio (along with the known conductance of resistor $R_O$) can be used to calculate the leakage resistance (or conductance) between field device terminals 18a and 18b.

Figure 5:
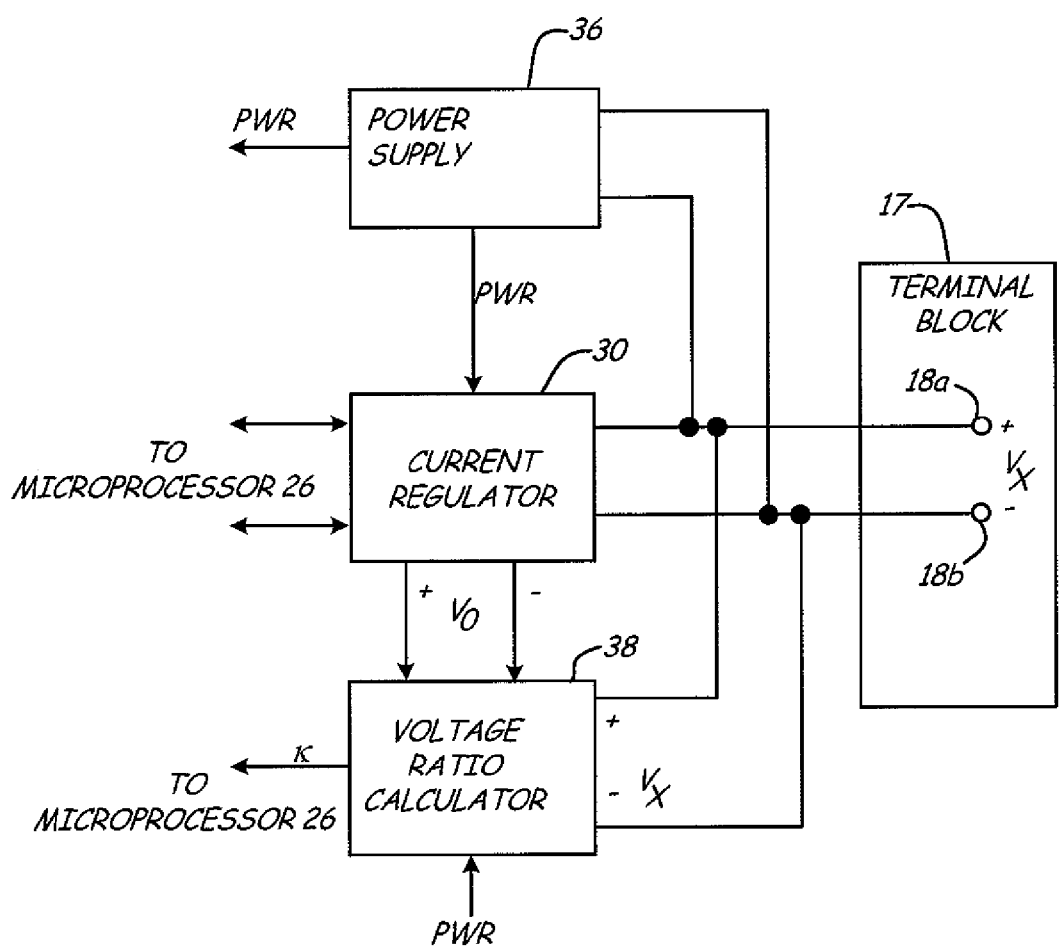
FIG. 5 is a functional block diagram of a components located within the communication chipset of the field device used to detect fluid in the terminal block of the field device.

FIG. 5 is a functional block diagram that illustrates the connection between components located within communication chipset 28 (shown in FIG. 2) that allow for the detection of terminal leakage between terminals 18a and 18b within terminal block 17. The components include power supply 36, current regulator circuit 30 (shown in more detail in FIG. 3), and voltage ratio calculator 38 (shown in more detail in FIG. 6). In one embodiment, each of these components is located within communication chipset 28 shown in FIG. 2.

As discussed with respect to FIGS. 4A and 4B, control room 32 provides approximately 20-25 volts between terminals 18a and 18b, labeled in FIGS. 4A and 4B as terminal voltage $V_X$. Power supply 36 is connected between terminals 18a and 18b and uses the 20-25 volts provided by control room 32 to provide regulated power (labeled as PWR) to devices and components located within field device 10 (for example, microprocessor 26, current regulator circuit 30, and voltage ratio calculator 38).

Current regulator circuit 30 is connected to receive input from microprocessor 26, and to regulate the current provided to terminals 18a and 18b. As discussed with respect to FIG. 3, the input received from microprocessor 26 may include a signal representative of a sensed processor variable as well as a signal to be communicated using a digital communication standard such as HART. In addition to digital communication, microprocessor may also instruct current regulator circuit 30 to modulate the loop current for the sole purpose of measuring voltage variation values associated with terminal voltage $V_X$ and current regulation voltage $V_0$.

Voltage ratio calculator 38 is connected to monitor the terminal voltage $V_X$ provided between terminals 18a and 18b, and the current regulation voltage $V_0$ generated across current regulation resistor $R_O$ within current regulator circuit 30. Based on the monitored terminal voltage $V_X$ and the current regulation voltage $V_0$, voltage ratio calculator 38 calculates a voltage variation ratio $\kappa$ (as shown in FIG. 5). Voltage ratio calculator 38 supplies the calculated voltage variation ratio $\kappa$ to microprocessor 26.

In one embodiment, microprocessor 26 stores the calculated voltage variation ratio $\kappa$. In another embodiment, microprocessor provides the calculated voltage variation ratio $\kappa$ to current regulator circuit 30, and instructs current regulator circuit 30 to communicate the calculated value to control room 32 using a digital communication protocol.

As discussed above, the calculation of an initial voltage variation value $\kappa_0$ and subsequent voltage variation values $\kappa_t$ allows the terminal leakage existing between terminals 18a and 18b to be determined.

Figure 6:
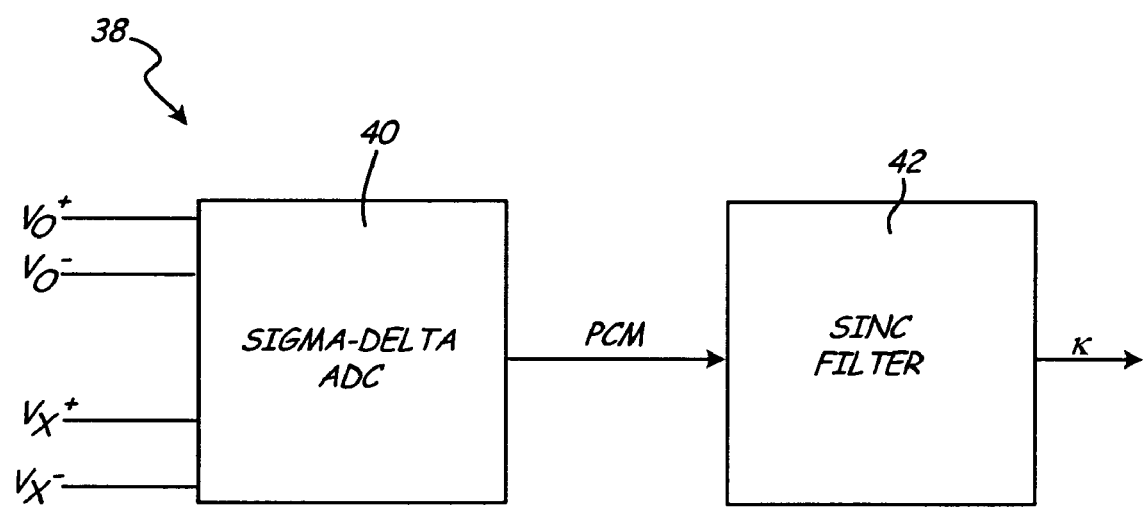
FIG. 6 is a functional block diagram of a voltage ratio converter for calculating the voltage ratio between the terminal voltage and the current regulator voltage.

FIG. 6 shows an embodiment of components used to implement voltage ratio calculator 38 (shown in FIG. 5). Voltage ratio calculator 38 includes a sigma-delta analog to digital converter (ADC) 40 and a SINC filter 42. In this embodiment, the terminal voltage $V_X$ provided between terminals 18a and 18b and the current regulation voltage $V_0$ provided across resistor $R_0$ are provided to sigma-delta ADC 40. Sigma-delta ADC 40 is comprised, in one embodiment, of a series of switches, capacitors, integrators (i.e., operational amplifier with capacitive feedback) and comparators. Sigma-delta ADC 40 operates to balance the charge provided by the terminal voltage $V_X$ and the current regulation voltage $V_0$.

Modulating the loop current by ±0.5 mA causes voltage variations in both the terminal voltage $V_X$ and the current regulation voltage $V_0$ (illustrated in FIG. 6 by the labels $V_0^+$ and $V_X^+$, which represent the peaks associated with the loop current modulation, and $V_0^-$ and $V_X^-$, which represent the troughs or low points associated with the loop current modulation. Sigma-delta ADC 40 measures a ratio between the inputs to the sigma-delta ADC by balancing the charge provided by the terminal voltage $V_X$ and current regulator voltage $V_0$. By modulating the loop current to create variations in the terminal voltage $V_X$ and current regulation voltage $V_0$, sigma-delta ADC 40 generates one-bit stream that represents the ratio between these voltage variations. That is, the density of the stream of 1's and 0's represents the ratio between the variation in the terminal voltage $V_X$ and the variation in the current regulation voltage $V_0$.

The one-bit stream of 1's and 0's, known as pulse coded modulation (PCM), is provided to SINC filter 42. Based on the PCM stream of 1's and 0's, SINC filter 42 converts this stream into a digital value representing the ratio of terminal voltage variation $\delta V_X$ to current regulation voltage variation $\delta V_0$. This ratio is represented by the dimensionless parameter $\kappa$. The measured $\kappa$ parameter can then be communicated along typical digital communication means to microprocessor 26. Microprocessor may either store the calculated parameter locally, or may instruct current regulator 30 to communicate the calculated parameter to control room 32.

Figure 7:
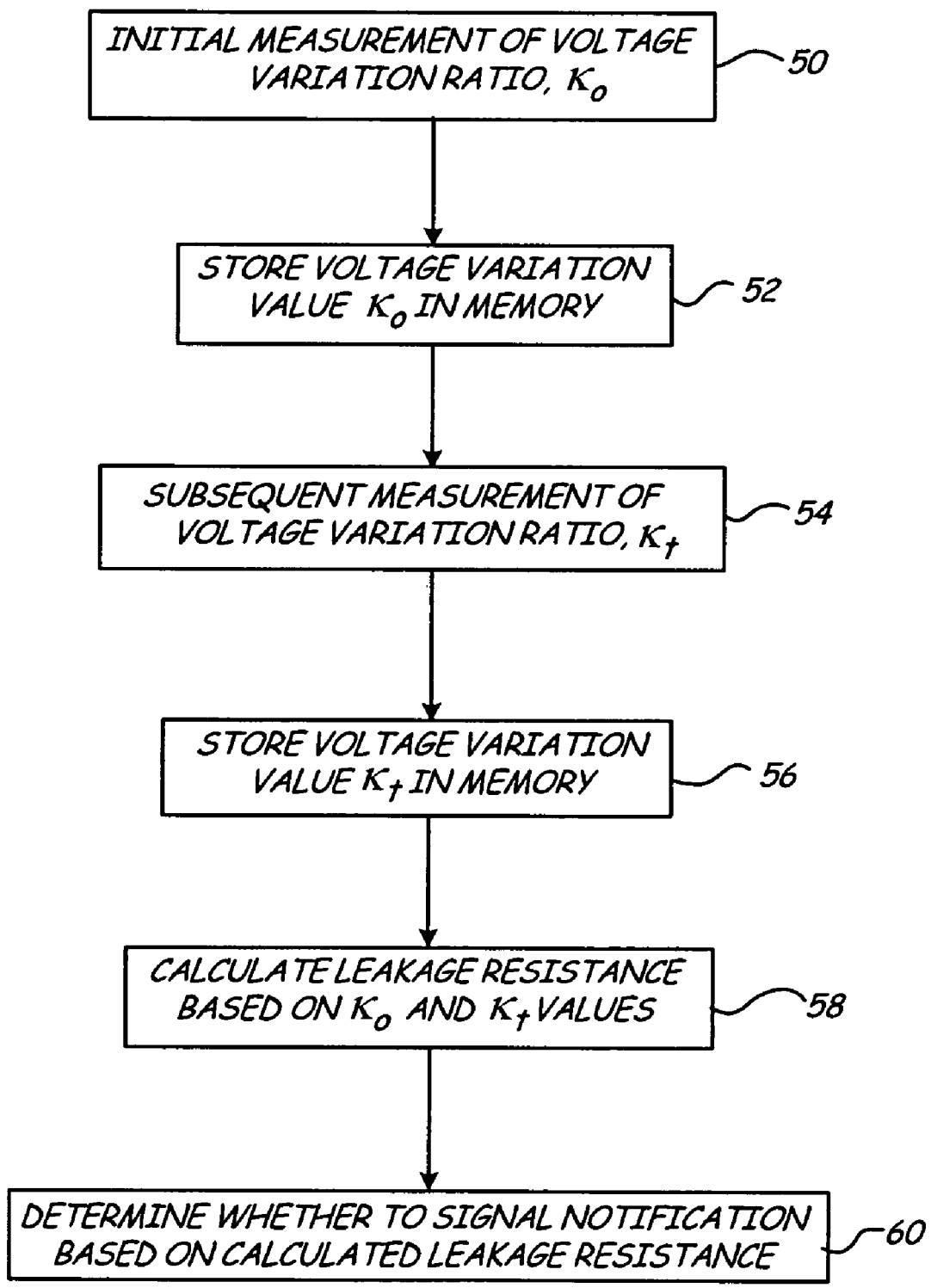
FIG. 7 is a flowchart illustrating a method of monitoring and detecting terminal leakage in the terminal block area.

FIG. 7 is a flowchart illustrating one embodiment of a method of determining the presence of terminal leakage. At step 50, an initial measurement of the ratio between terminal voltage $V_X$ and current regulation voltage $V_O$ is made, referred to as $\kappa_0$. In one embodiment, control room 32 may issue a command to field device 10, instructing field device 10 (specifically voltage ratio calculator 38) to measure the voltage variation ratio $\kappa$ value (referred to as the $\kappa_0$ value). In another embodiment, upon installation field device 10 may automatically initiate the measurement of the $\kappa_0$ value.

At step 52, the initial dimensionless parameter $\kappa_0$ is stored to memory. Field device 10 may store the $\kappa_0$ value locally or may communicate the $\kappa_0$ to control room 32, which would then store the $\kappa_0$ value.

At step 54, at some time subsequent to the initial measurement of the $\kappa_0$ value, field device 10 makes a secondary measurement of the ratio between terminal voltage $V_X$ and current regulation voltage $V_0$, referred to as $\kappa_t$. The measurement of the $\kappa_t$ value may be in response to an instruction received from control room 30, or may be done periodically by field device 10 to ensure no terminal leakage exists between terminals 18a and 18b of field device 10.

At step 56, the subsequent voltage variation value $\kappa_t$ is stored to memory. Once again, the voltage variation value $\kappa_t$ may be stored locally on field device 10, or may be communicated to control room 32 for storage.

At step 58, based on the initial measurement of the voltage variation parameter $\kappa_o$, and the subsequent measurement of the voltage variation parameter $\kappa_t$, the leakage resistance or conductance $g_X$ can be estimated using equation 6. This calculation may be performed locally by microprocessor 26, or the measured $\kappa_t$ parameter may be communicated to control room 32, which would then perform the calculation of the leakage resistance.

At step 60, based on the calculated leakage conductance $g_X$, a decision is made whether the leakage conductance is sufficiently high to cause distortion of the signal being provided by field device 10. That is, the calculated leakage conductance may be compared to a threshold value to determine whether a notification or alarm should be sounded with respect to field device 10.

Figure 8A:
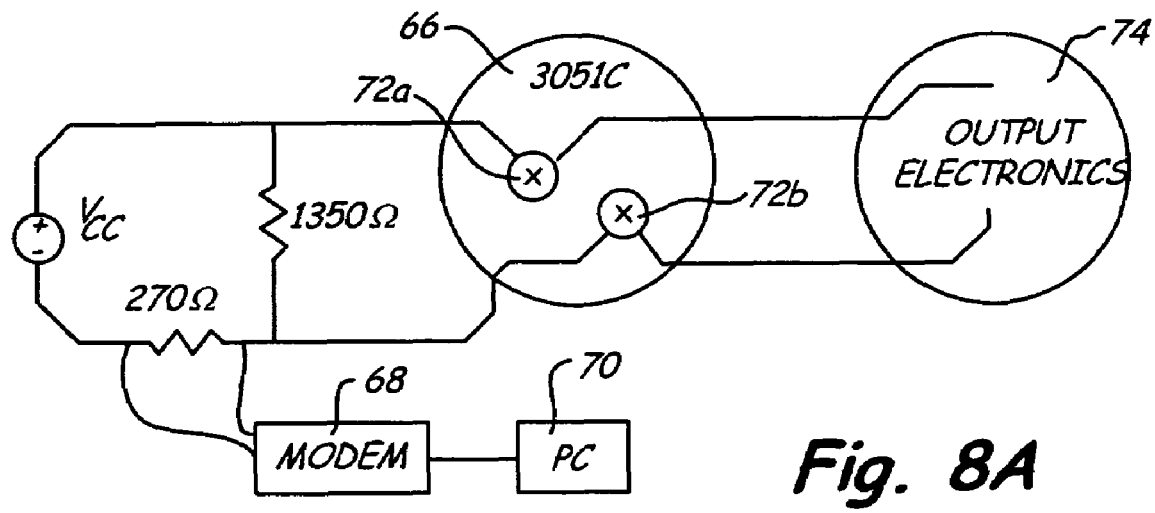
FIGS. 8A and 8B are circuit diagrams of hardware employed to test the practicality and accuracy of the present invention.
Figure 8B:
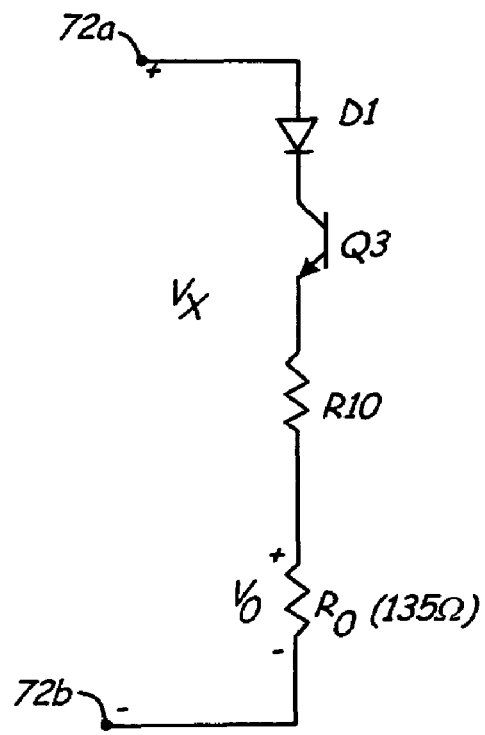

FIGS. 8A and 8B illustrate the connection of hardware used to test the practicality and accuracy of the leakage resistance calculations made based on voltage ratio measurements. To conduct the experiment, the following components were employed: a voltage source VCC, a 270 ohm ($\Omega$) resistor representing the resistance outside of field device 10, a 1350$\Omega$ resistor representing leakage resistance $R_X$, a Rosemount 3051C pressure transmitter 66, modem 68 and personal computer 70. The 3051 pressure transmitter 66 includes field terminals 72a and 72b and output electronics 74, which includes current regulation circuitry shown in FIG. 8B. Modem 68 and PC 70 are connected across the 270$\Omega$ resistor to allow a user to control the current generated through the 270$\Omega$ resistor for purposes of the experiment.

FIG. 8B illustrates the circuit configuration within output electronics 74, including diode D1, transistor Q3, resistor R10 and current regulation resistor $R_0$. In this embodiment, current regulation resistor $R_0$ has a resistance of 135 ohms. As shown in FIG. 8B, terminal voltage $V_X$ is measured across field terminals 72a and 72b, and current regulation voltage $V_0$ is measured across resistor $R_0$.

For purposes of putting this experiment in context, the experimental setup shown in FIGS. 8A and 8B can be compared to field transmitter 10 shown in FIG. 1. The 3051 field device 10 shown in FIG. 8A corresponds with field device 10 shown in FIG. 1. Output electronics 74 shown in FIG. 8A correspond with circuit board 16 shown in FIGS. 1 and 2. Field terminals 72a and 72b shown in FIGS. 8A and 8B correspond to field terminals 18a and 18b shown in FIG. 1. The 3051$\Omega$ resistor shown in FIG. 8A corresponds with resistor $R_X$ shown in FIG. 4B.

In this experiment, modem 68 and PC 70 were employed to set the loop current through the 270$\Omega$ resistor to different values. The voltage variations $\delta V_X$ and $\delta V_0$ for each current value were measured by measuring the resulting voltage $V_X$ and $V_0$ with the current set 0.5 mA above the selected current value and then measuring the resulting voltage $V_X$ and $V_0$ with the current set 0.5 mA below the selected current value. By subtracting the first measured value of terminal voltage $V_X$ and current regulation voltage $V_0$ from the second measured value of terminal voltage $V_X$ and current regulation voltage $V_0$, respectively, the voltage variation $\delta V_X$ and $\delta V_0$ is determined. The ratio $\kappa$ is determined by dividing the voltage variation $\delta V_0$ by the voltage variation $\delta V_X$. This method of determining the voltage variation is employed only for the purposes of this experiment. Actual implementation in a field device would vary. For example, as discussed with respect to FIG. 6, a voltage ratio digital converter comprised of a sigma-delta modulator and SINC filter may be employed to measure the voltage variation ratio between $\delta V_X$ and $\delta V_0$.

Table 1 (shown below) illustrates the resulting measurements and calculations performed for the case without leakage (i.e., when leakage resistor $R_X$ is removed from the configuration). The first column indicates the loop current set by modem 68 and PC 70. The second column shows the resulting voltage variations $\delta V_0$ calculated with respect to the corresponding loop current shown in the first column. The third column shows the resulting voltage variations $\delta V_X$ calculated with respect to the corresponding loop current shown in the first column. The fourth column shows the resulting voltage variation ratio, $\kappa_0$, and is calculated based on the measured voltage variations shown in the second and third columns.

TABLE 1

Measurement of Voltage Variation, no leakage resistance

| Loop Current | $\delta V_0$ | $\delta V_X$ | $\kappa_0$ |
|---|---|---|---|
| 5.0 ± 0.5 mA | −134.80 mV | 280.3 mV | 0.4809 |
| 12.0 ± 0.5 mA | −134.80 mV | 274.8 mV | 0.4907 |
| 19.0 ± 0.5 mA | −134.80 mV | 273.3 mV | 0.4937 |

Table 2 illustrates measurements made following the connection of the leakage resistor $R_X$ (1350Ω) between field terminals 72a and 72b, emulating the presence of leakage resistance between the field terminals. Once again, the current through resistor $R_0$ is set by modem 68 and PC 70 at three different values, and corresponding voltage variation values were measured for each value. Based on the measured voltage variations, the dimensionless parameter $\kappa_t$, is calculated by dividing the voltage variation value $\delta V_0$ by $\delta V_X$.

TABLE 2

Measurement of Voltage Variation with leakage resistance

| Loop Current | $\delta V_0$ | $\delta V_X$ | $\kappa_t$ |
|---|---|---|---|
| 5.0 ± 0.5 mA | −134.80 mV | 233.7 mV | 0.5768 |
| 12.0 ± 0.5 mA | −134.80 mV | 228.6 mV | 0.5898 |
| 19.0 ± 0.5 mA | −134.80 mV | 227.4 mV | 0.5931 |

Table 3 illustrates the calculation of leakage resistance (known in this experiment to be approximately 1350Ω) using the calculated values of $\kappa_0$ and $\kappa_t$ listed in the fourth column of tables 1 and 2 and equation 6 from above, reproduced here for simplicity.

$$g_X = (\kappa_t - \kappa_0) * g_0 \qquad \text{Equation 6}$$

TABLE 3

Estimation of Leakage Resistance

| Loop Current | $\kappa_t - \kappa_0$ | $R_X$ |
|---|---|---|
| 5.0 ± 0.5 mA | 0.0959 | 1408 |
| 12.0 ± 0.5 mA | 0.0991 | 1362 |
| 19.0 ± 0.5 mA | 0.0994 | 1358 |

Table 3 illustrates that for each value of loop current provided, an accurate prediction of the leakage resistance was calculated using Equation 6. Therefore, not only did the above experiment indicate that the present invention is suitable for detecting and quantifying leakage resistance between the terminals of a field device, but that the calculation of the leakage resistance is not dependent on the magnitude of the loop current. The use of voltage variations ($\delta V_0$ and $\delta V_X$) makes the calculation of terminal leakage independent of external factors such as variations in the supply power and variations in the loop current. That is, setting the loop current to 5.0±0.5 mA results in approximately the same calculation of leakage resistance as setting the loop current to 19.0±0.5 mA (1408Ω vs. 1358Ω). Therefore, no special information regarding the present status or value of the loop current is required in order to measure and determine the leakage resistance.

Although the present invention has been described with reference to preferred embodiments, workers skilled in the art will recognize that changes may be made in form and detail without departing from the spirit and scope of the invention. In particular, the present invention has been described with respect to a field device that communicates with a control room by modulating a 4-20 mA loop current based on a sensed process variable. In other embodiments, the present invention could be implemented in conjunction with field devices that communicate using only a digital communication protocol (such as Foundation Fieldbus).

The invention claimed is:

1. A field device which detects terminal leakage, the field device comprising:
   a sensor device for measuring a process variable;
   a first terminal and a second terminal connected to communicate with a control room, a terminal voltage existing between the first and second terminal;
   a current regulation circuit connected to the first and second terminals of the field device, wherein the current regulation circuit regulates the current provided to the first and second terminals of the field device by regulating a current regulation voltage; and
   a voltage ratio calculator connected to the first terminal and the second terminal and to the current regulation circuit, the voltage ratio calculator measures a voltage variation ratio value κ based on variations in the terminal voltage and variations in the current regulation voltage caused by modulation of the current by the current regulation circuit, wherein the presence of terminal leakage between the first terminal and the second terminal is detected based on the measured voltage variation ratio value κ.

2. The field device of claim 1, wherein the voltage ratio calculator includes:
   a sigma-delta modulator that receives the terminal voltage and the current regulation voltage as input and provides a one-bit output stream that represents a ratio between variations in the terminal voltage and variations in the current regulation voltage; and
   a sinc filter that converts the one-bit output stream provided by the sigma-delta modulator to a digital value representing the voltage variation ratio κ.

3. The field device of claim 1, further including:
   a microprocessor for calculating the terminal leakage based on voltage variation values κ measured by the voltage ratio calculator and provided to the microprocessor.

4. The field device of claim 3, wherein the microprocessor calculates terminal leakage between the first and second terminals of the field device by comparing a first measured voltage variation value $\kappa_0$ to a subsequently measured voltage variation value $\kappa_t$.

5. The field device of claim 1, further including:
   a memory device for storing voltage variation values calculated by the voltage ratio calculator.

6. The field device of claim 1, wherein the detection of the terminal leakage between the first and second terminals of the field device is based on the following equation: $g_X = (\kappa_t - \kappa_0)$

*$g_0$, wherein $\kappa_0$ represents a first voltage variation ratio, $\kappa_t$ represents a subsequent voltage variation ratio, $g_0$ represents the conductance (inverse of resistance) of the first resistor and $g_X$ represents the conductance of the terminal leakage between the first and second terminals of the field device.

7. A method of detecting terminal leakage between a first terminal and a second terminal located within the housing of a field device, the method comprising:

modulating a loop current between the first terminal and the second terminal at an initial time $t_0$;

measuring an initial voltage variation ratio $\kappa_0$ based on variations in an initial terminal voltage between the first terminal and the second terminal and variations in an initial current regulation voltage within a current regulation circuit connected between the first and second terminals;

modulating the loop current between the first terminal and the second terminal at a subsequent time $t_t$;

measuring a subsequent voltage variation ratio $\kappa_t$ based on variations in a subsequent terminal voltage and variations in a subsequent current regulation voltage; and calculating terminal leakage based on the measured values of the initial voltage variation value $\kappa_0$ and the subsequent voltage variation value $\kappa_t$.

8. The method of claim 7, wherein calculating terminal leakage based on the measured values of the initial voltage variation value $\kappa_0$ and the subsequent voltage variation value $\kappa_t$ is based on the following equation: $g_X = (\kappa_t - \kappa_0)^* g_0$.

9. The method of claim 7, further including:

storing the initial voltage variation value $\kappa_0$ to a memory device located on the field device; and storing the subsequent voltage variation value $\kappa_t$ to a memory device located on the field device, wherein the initial voltage variation value $\kappa_0$ and subsequent voltage variation value $\kappa_t$ are made available to a microprocessor for calculating terminal leakage.

10. The method of claim 7, further including:

communicating the initial voltage variation value $\kappa_0$ to a control room connected to the field device; and communicating the subsequent voltage variation value $\kappa_t$ to the control room connected to the field device, wherein the control room calculates the terminal leakage based on the initial voltage variation value $\kappa_0$ and the subsequent voltage variation value $\kappa_t$.

11. The method of claim 7, wherein measuring the initial voltage variation value $\kappa_0$ includes:

providing the initial terminal voltage and the initial current regulation voltage to a sigma-delta modulator that provides a one-bit stream representing the ratio between variations in the initial terminal voltage and variations in the initial current regulation voltage; and providing the one-bit stream to a sinc filter that provides a digital value representing the initial voltage variation value $\kappa_0$.

12. The method of claim 7, wherein measuring the subsequent voltage variation value $\kappa_t$ includes:

providing the subsequent terminal voltage and the subsequent current regulation voltage to a sigma-delta modulator that provides a one-bit stream representing the ratio between variations in the subsequent terminal voltage and variations in the subsequent current regulation voltage; and providing the one-bit stream to a sinc filter that provides a digital value representing the subsequent voltage variation value $\kappa_t$.

13. The method of claim 7, further including:

determining whether to initiate an alarm based on the calculated terminal leakage value.

14. The method of claim 7, wherein measuring an initial voltage variation ratio $\kappa_0$ is performed at the request of a control room connected to communicate with the field device.

15. The method of claim 7, wherein measuring an initial voltage variation ratio $\kappa_0$ is performed automatically upon installation of the field device.

16. The method of claim 7, wherein measuring a subsequent voltage variation ratio $\kappa_t$ is performed at the request of a control room connected to communicate with the field device.

17. The method of claim 7, wherein measuring a subsequent voltage variation ratio $\kappa_t$ is performed periodically by the field device.

18. The method of claim 7, wherein modulating the loop current at the initial time $t_0$ and the subsequent time $t_t$ is done at a request of a microprocessor for a purpose of measuring the voltage variations of the terminal voltage and the current regulation voltage.

19. The method of claim 7, wherein modulating the loop current at either the initial time $t_0$ or the subsequent time $t_t$ is for a dual purpose of providing digital communication between the field device and a control room and for measuring the voltage variation of the terminal voltage and the current regulation voltage.

20. A field device capable of detecting terminal leakage between a first terminal and a second terminal located within a housing of the field device, the field device comprising:

a current regulation circuit for regulating the magnitude of a current flowing between the first and second terminals by regulating a current regulation voltage within the current regulation circuit and for modulating the current between the first and second terminals;

means for measuring a voltage variation ratio $\kappa$ based on variations in a terminal voltage existing between the first terminal and the second terminal and variations in the current regulation voltage caused by the modulation of the current between the first and second terminals; and means for calculating terminal leakage based on the measured voltage variation ratio $\kappa$.

21. The field device of claim 20, wherein the means for calculating terminal leakage compares a first measured voltage variation ratio $\kappa_0$ to a subsequently measured voltage variation value $\kappa_t$ to calculate the terminal leakage.

22. The field device of claim 21, further including:

memory means for storing the initial voltage variation value $\kappa_0$ and the subsequent voltage variation value $\kappa_t$ measured by the means for measuring voltage variation ratio $\kappa$.

23. The field device of claim 20, wherein the current regulation circuit includes:

means for communicating the voltage variation ratio calculated by the means for measuring a voltage variation ratio to a control room connected to the field device, wherein the control room calculates the terminal leakage based on the voltage variation ratio.

24. The field device of claim 20, wherein the means for measuring a voltage variation ratio includes:

a sigma-delta modulator that receives the current regulator voltage and the terminal voltage as input and provides as output a one-bit stream representing the ratio between variations in the terminal voltage and variations in the current regulation voltage; and a sinc filter connected to the sigma-delta modulator that converts the one-bit stream provided by the sigma-delta modulator to a digital value representing the voltage variation ratio $\kappa$.

25. The field device of claim 20, wherein the means for calculating terminal leakage includes:

means for determining whether to initiate an alarm based on the calculated terminal leakage value.

* * * * *